United States Patent [19]

Oliver

[11] Patent Number: 5,484,133
[45] Date of Patent: Jan. 16, 1996

[54] MANUAL OVERRIDE SYSTEM FOR LINEAR MAGNETICALLY OPERATED VALVE

[75] Inventor: John B. Oliver, Dartmouth, Canada

[73] Assignee: Nova Scotia Research Foundation, Dartmouth, Canada

[21] Appl. No.: 211,816

[22] PCT Filed: Oct. 9, 1992

[86] PCT No.: PCT/CA92/00391

§ 371 Date: Apr. 19, 1994

§ 102(e) Date: Apr. 19, 1994

[87] PCT Pub. No.: WO94/05938

PCT Pub. Date: Mar. 17, 1994

[51] Int. Cl.$^6$ ................................................. F16K 31/08
[52] U.S. Cl. ........................................ 251/14; 251/65
[58] Field of Search ......................... 251/14, 65, 129.03

[56] References Cited

U.S. PATENT DOCUMENTS

| | | | |
|---|---|---|---|
| 4,384,703 | 5/1983 | Ruyak et al. | 251/65 |
| 4,844,407 | 7/1989 | Baker | 251/14 |
| 4,921,207 | 5/1990 | Baker | 251/14 |
| 5,372,351 | 12/1994 | Oliver | 251/14 X |

FOREIGN PATENT DOCUMENTS 1092589  12/1980  Canada.

Primary Examiner—Gerald A. Michalsky
Assistant Examiner—Kevin L. Lee
Attorney, Agent, or Firm—Jones, Tullar & Cooper

[57] ABSTRACT

The present invention provides a manual override system for a linear magnetically operated valve assembly having a valve member reciprocally located in a valve body. A first carrier member connected to the valve member mounts a peripheral set of driven magnets. A barrier member surrounds the first carrier member and is hermetically sealed to the valve body. A second carrier member surrounds the barrier member and mounts a set of driven magnets for magnetically inducing following linear movement in the first carrier member and the valve member in response to specific linear movement of the second carrier member. The manual override system includes a piston member reciprocally located in the valve body for linear movement between the valve body and the first carrier member, the piston member having an annular skirt thereon sealingly engaging an inner bore of the valve body and defining first and second sealed chambers on respective sides thereof within the valve body. Hydraulic fluid is contained within each chamber. One of the chambers can be further pressured while the other chamber is drained to effect linear movement of the piston member into abutting engagement with the valve member or the first carrier member to move the valve member towards a closed or an open valve position respectively. The override system is effective in opening or closing a jammed valve in which the magnetic interaction is not sufficient to effect movement of the valve member.

4 Claims, 2 Drawing Sheets

MANUAL OVERRIDE SYSTEM FOR LINEAR MAGNETICALLY OPERATED VALVE

TECHNICAL FIELD

The present invention relates in general to linear magnetically operated valves and in particular to a manual override system for such valves.

BACKGROUND ART

Magnetically coupled valves are well known devices for use in systems in which fugitive emissions cannot be tolerated. One such valve is taught in Canadian Patent No. 1,092,589 issued on Dec. 30, 1980 to Nova Scotia Research Foundation Corporation. That valve is a rotary valve and has its valve member, e.g. a butterfly, attached to a valve stem which is rotatable on a rotation axis and which is also attached to a carrier. The carrier mounts a plurality of rare earth magnets about its outer periphery, with adjacent magnets having alternate polarity. The carrier is enclosed by a barrier member which is hermetically sealed to the valve body so that hazardous material passing through the valve is always contained within the barrier member and the valve body.

Externally of the barrier member is another carrier, usually annular in shape, this carrier mounting another plurality of rare earth drive magnets about the internal circumference thereof, these magnets also being of alternating opposite polarity. A suitable means, such as a handle, valve actuator, or lever arm, is provided to effect rotary movement of the drive carrier relative to the stationary barrier. Magnetic interaction across the barrier member causes the internal driven carrier to follow the rotary movement of the external drive carrier so that the valve member is rotated to progressively open or close tile valve. Rotation limit means can be provided to prevent the valve member from rotating too far in the valve body.

Linear magnetic valves are also available, operating on essentially the same principles. The valve member is adapted to reciprocate between limits corresponding to completely open and completely closed conditions of the valve. The valve member is connected to a valve stem which is also connected to a carrier. The carrier mounts a plurality of rare earth magnets about its outer periphery, with adjacent magnets being of alternating polarity. The carrier and the valve stem are enclosed by a barrier which is hermetically sealed to the valve body so that hazardous material passing through the valve is always contained within the barrier member and the valve body.

Externally of the barrier member is another carrier, usually annular in shape, this carrier mounting a plurality of rare earth drive magnets about the internal circumference thereof, these magnets also being of alternating opposite polarity. A suitable means such a pneumatic motor connected to a yoke is provided to effect reciprocating movement to the drive carrier relative to the stationary barrier. Magnetic interaction across the barrier member causes the internal driven carrier to follow the linear movement of the external drive carrier so that the valve member is moved to progressively open or close the valve.

There may be instances in which either type of valve, capable of handling heavy flow volumes, will jam and the drive forces available magnetically may not be sufficient to overcome the jam. It is therefore imperative that there be some mechanism available to override the magnetic operation of the valve so that the valve can be either opened or closed by hand until such time as the fault which caused the jam can be rectified. Usually the fault is such that the valve must be dismantled, repaired, and rebuilt; otherwise there would have been no problem in the first place.

DISCLOSURE OF INVENTION

Recently filed P.C.T. application No. PCT/CA92/00233 teaches a mechanism which can be utilized to overcome the problems of a jammed valve when the valve is of the rotary magnetic type. However, that mechanism will not work with a linear magnetic valve since the operating principles are especially adapted to the rotary type of valve. The present invention addresses the linear magnetic valve and provides an override system appropriate to that style of valve.

The present invention provides a small hydraulic system that can be provided on a linear magnetic valve to forcibly move a valve member that has jammed and that cannot be moved through the magnetic forces alone. The invention involves an hydraulically operated piston positioned within the valve body between the valve member and the internal driven carrier, the piston normally being hydraulically locked against any kind of linear movement. In the event of a malfunction wherein the valve member is immobile because it has jammed the piston can then be moved hydraulically in the desired direction to push against the valve member or the internal carrier so as to move the valve member to close or open the valve respectively. Thereafter the valve can be dismantled so that the necessary repairs can be effected. Hydraulic movement of the piston is effected by connecting a hand or powered hydraulic pump to the valve body so that the appropriate annular chamber adjacent an annular skirt of the piston can be pressurized and thereby move the piston in the desired direction.

In summary therefore the present invention can be considered as providing a manual override system for a linear magnetically operated valve assembly having a valve member reciprocally located in a valve body, a first carrier member connected to the valve member and mounting a peripheral set of driven magnets, a barrier member surrounding the first carrier member and being hermetically sealed to the valve body, and a second carrier member surrounding the barrier member and mounting a set of drive magnets for magnetically inducing following linear movement in the first carrier member and the valve member in response to specific linear movement of the second carrier member, the manual override system comprising: a piston member reciprocally located in the valve body for linear movement between the valve body and the first carrier member, the piston member having an annular skirt thereon sealingly engaging an inner bore of the valve body and defining first and second sealed chambers on respective sides thereof within the valve body; hydraulic fluid contained within each chamber; and means for further pressurizing one of the chambers while draining the other chamber to effect linear movement of the piston member into abutting engagement with the valve member or the first carrier member to move the valve member towards a closed or an open valve position respectively.

BEST MODE OF CARRYING OUT THE INVENTION

Figure 1:
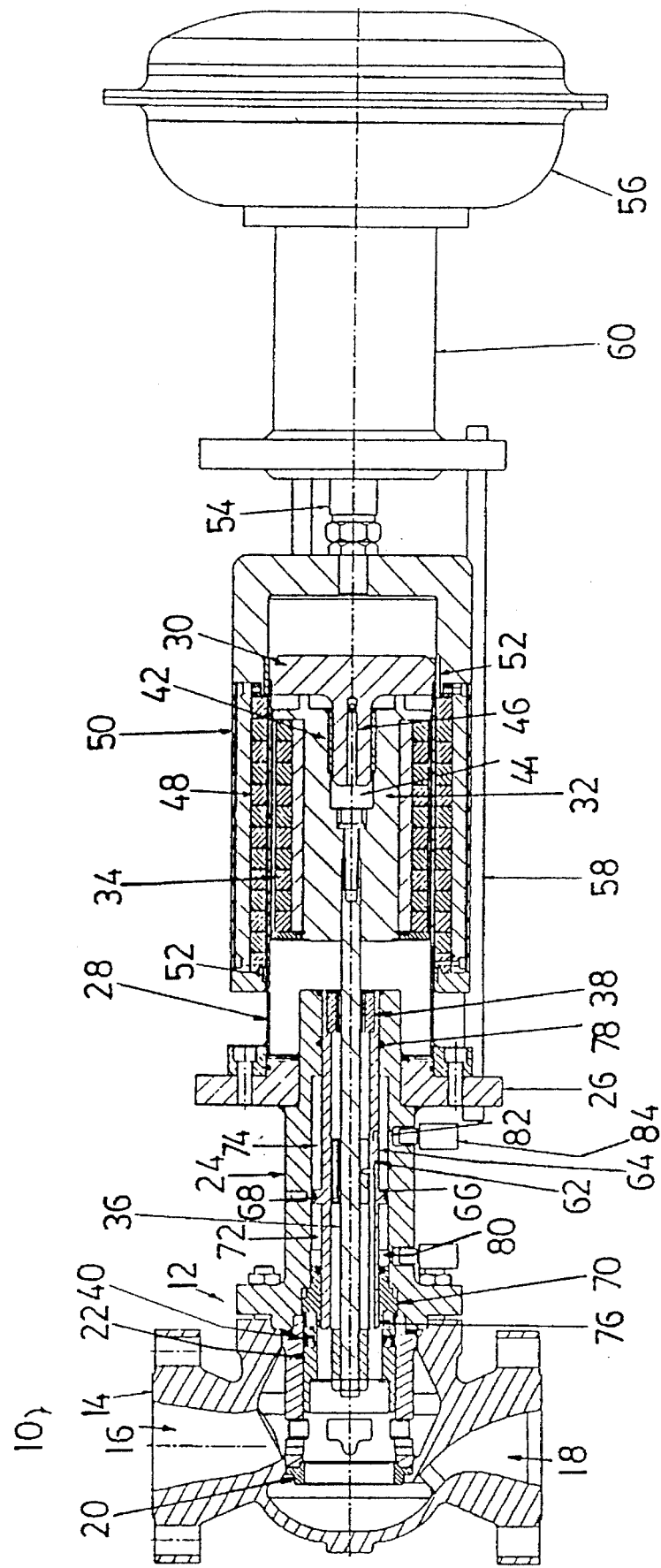
FIG. 1 shows a longitudinal cross section through a linear magnetic valve incorporating the present invention.

FIG. 1 of the drawings shows a linear magnetically operated valve 10 to which the present invention has been applied. The valve 10 will be initially described, it being noted that there is a valve body 12 which includes at one end thereof a section 14 having openings 16 and 18 connectable to suitable conduits through which a fluid to be controlled can pass. The valve body 12 includes a circular seat 20 against which a valve plug or member 22 can bear to close the valve against passage of fluid therethrough. When the valve member is bearing against the seat 20 fluid cannot pass from opening 16 to opening 18 or vice versa. Hermetically secured to the housing is a body extension 24 to which is welded a weldment 26. A cup-shaped barrier member 28 is sealed to the weldment 26, the member 28 including a solid end cap 30 so that the interior of the valve 10 is fully sealed and contained by the housing 14, the extension 24, the weldment 26, the barrier 28, and the end cap 30. Suitable gaskets and O-rings are provided where required to ensure that the interior of the valve 10 is hermetically sealed from the surrounding atmosphere.

The linear motion of the valve member 22 is achieved through magnetic interaction. In this case there is a first carrier member 32 reciprocally contained within the barrier 28, the carrier member mounting thereon a plurality of rare earth magnets 34 of alternating opposite polarities. The carrier member 32 is connected to one end of a longitudinally extending valve stem 36, the other end of which is connected to the valve member 22. The assembly of the carrier member 32, the valve stem 36, and the valve member 22 is free to reciprocate within the pressure containment envelope of the valve 10, supported by a bushing 38, a piston ring 40 in the valve member, and a bushing 42 contained in a counterbore 44 of the carrier member 32 and sliding on a spigot 46 provided on the end cap 30 of the barrier 28. Typically, axial movement of the valve member 22 and associated components is restricted to about one inch (2.5 cm), and when the valve member 22 is up against the seat 20 flow through the valve is shut off; the valve is fully open at the other extreme of the stroke.

The inner magnets 34 are driven by outer rare earth magnets 48 which are mounted to a second carrier member 50 that surrounds the barrier 28. These magnets are also of alternating opposite polarity and are held concentric with the inner magnets by the carrier member 50. Bushings 52 within the carrier member 50 run on the outer surface of the barrier 28. The carrier member 50 is in turn connected to the drive stem 54 of a pneumatic motor 56 mounted to the valve 10 by supporting rods 58. In the valve assembly as shown the normal position, without air pressure, is "open" (a normally open valve). A very strong return spring (not shown) is contained within the yoke 60 of the motor and holds the valve member open relative to the valve seat 20. Air pressure within the motor 56 overcomes the spring force to drive the valve member to its closed position. An alternative type of valve, working in reverse, is the normally closed type. The normal working position of this type of valve is with its axial centerline oriented vertically.

If the valve member 22 were to jam or become stuck one can easily see how the inner and outer magnets would "slip" relative to each other if the force required to move the valve member were greater than the force transmission limit of the magnet couple.

The present invention provides a manual override that solves the slip problem identified above. A small hydraulic system is incorporated into the valve body and is normally never used, lying quietly while the valve operates around it. This system involves a cylindrical piston member 62 contained within a bore 64 of the valve body extension 24, the piston member 62 having an annular skirt 66 centrally thereof, the skirt mounting an O-ring 68 for sealing contact with the internal surface of the extension bore 64. The piston member 62 is held in place by a threaded plug 70 at one end and mounts the bushing 38 internally thereof at the other end, the valve stem 36 being reciprocally movable within the piston member 62. With the piston member 62 in its normal rest position as seen in FIG. 1 the skirt 66 divides the bore 64 into first and second annular chambers 72 and 74, which chambers are sealed from other areas of the valve by the O-rings 76, 78.

The chambers 72, 74 are provided with threaded ports 80, 82 respectively which communicate the chamber with the atmosphere through the wall of the extension 24. Each port 80, 82 is provided with a self-sealing quick-connect plug 84.

With the piston member 62 in its normal position both chambers 72, 74 are filled with hydraulic fluid via suitable hoses attached to quick-connect mating stems 86 (FIGS. 2, 3) which are, in turn, plugged into each quick-connect plug 84. This filling procedure is usually done under vacuum to remove as much air as possible from the chambers, and to completely fill the voids therein with hydraulic fluid. When each chamber is full, at normal atmospheric pressure, the mating stems 86 are removed from the plugs 84. Because the plugs 84 are self-sealing, each chamber will be sealed off. In this condition the piston member 62 will be effectively held in position by the resulting hydraulic lock, and will remain so throughout the normal operation of the valve.

Figure 3:
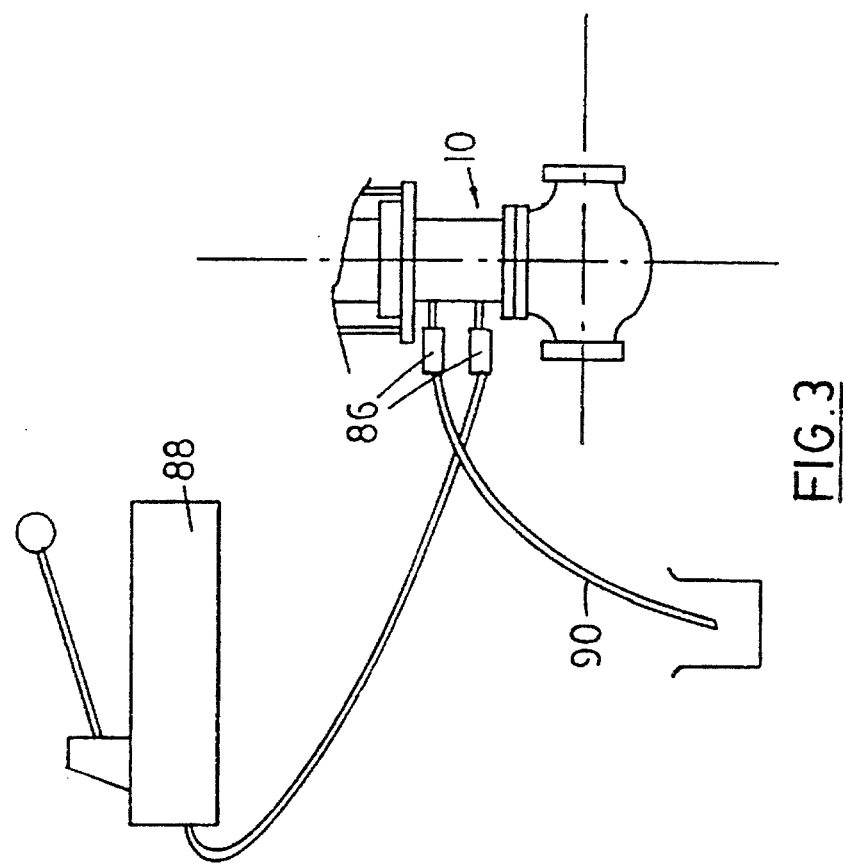
FIG. 3 shows the connections to effect override movement in a valve opening direction.
Figure 2:
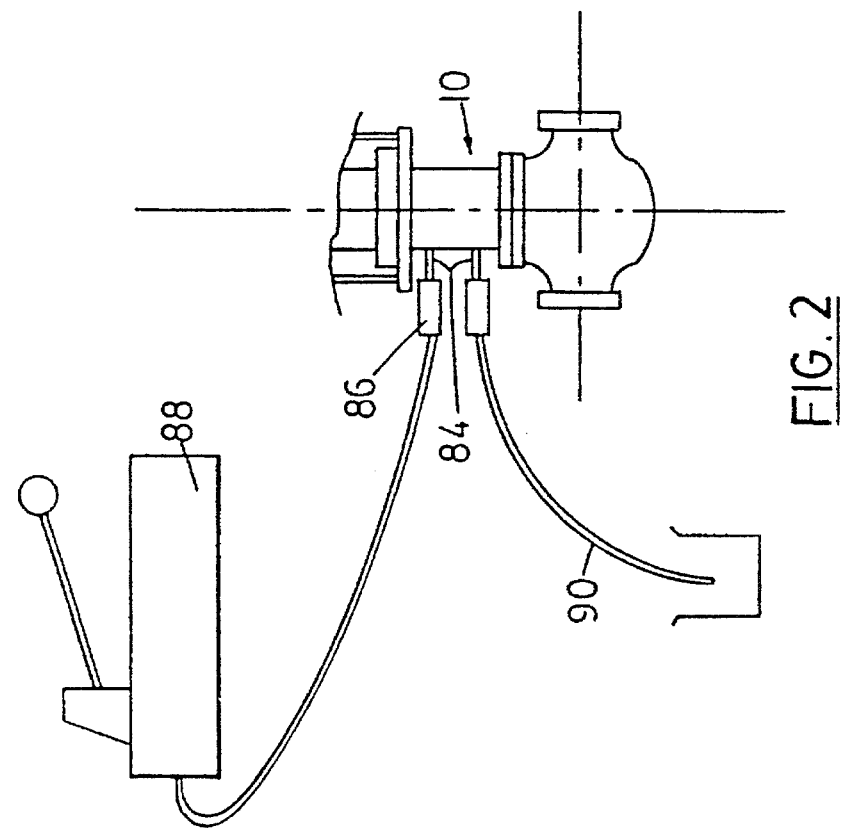
FIG. 2 shows the connections to effect override movement in a valve closing direction.

If the valve ever becomes jammed or stuck in position, such that the force from either the return spring of the motor 56, or the air driven stroke of the motor were greater than the maximum transmissible force through the magnetic coupling, then connecting into the system of the invention allows the operator to apply a much greater force to the valve member 22 to move it, should it become important that it be moved. Referring to FIGS. 2 and 3 one can hook up a hand pump 88, for example, fitted with a suitable hose and quick-connect stem 86 to either side of the piston member 62 via the quick-connect plug 84 so that hydraulic pressure can be increased in the appropriate chamber 72 or 74 to move the piston member 62 in the required direction. Of course, in order to remove the hydraulic lock and allow the piston member to move, a drain line 90 must be plugged into the other quick-connect plug 84 using a suitable mating stem 86. As the piston member 62 moves it can move the valve member by either bearing directly on it, to move it to the "closed" condition, or by pushing on the first carrier member 32 in the opposite direction to move the valve member 22 to the "open" condition.

The present invention is only meant to be used once, in an emergency. If such an instance should occur it would be imperative that the valve be isolated from the system at some appropriate time, and a full investigation made of the circumstances that caused the valve failure.

It should be noted that this is a non-destructive device and the unit can be put back into service after an investigation and overhaul. When this system is operated, some of the O-ring seals can become unseated. This does not affect the operation of the unit, but returning the piston member 62 to its normal position could damage these seals. Disassembly of the unit should be undertaken to ensure that the seals are properly seated.

INDUSTRIAL APPLICABILITY

This invention is valuable in many industries, especially those such as the petrochemical industry, which uses a great many high flow rate and high volume valves. It allows an operator to quickly restore operation to a jammed valve or to isolate the valve by closing it completely so that repairs can be made on a timely basis. Great savings can be realized through early detection of failed valves and by being able to prevent further damage that might occur if the valve is not taken out of service promptly and repaired as soon as possible.

It is understood that changes could be effected in the disclosed invention by a skilled practitioner in the art without departing from the essence of the invention. Thus the protection to be afforded this invention is to be ascertained from the claims appended hereto.

I claim:

1. A manual override system for a linear magnetically operated valve assembly having a valve member reciprocally located in a valve body, a first carrier member connected to said valve member and mounting a peripheral set of driven magnets, a barrier member surrounding said first carrier member and being hermetically sealed to said valve body, and a second carrier member surrounding said barrier member and mounting a set of drive magnets for magnetically inducing following linear movement in said first carrier member and said valve member in response to specific linear movement of said second carrier member, said manual override system comprising: a piston member reciprocally located in said valve body for linear movement between said valve body and said first carrier member, said piston member having an annular skin thereon sealingly engaging an inner bore of said valve body and defining first and second sealed chambers on respective sides thereof within the valve body; hydraulic fluid contained within each chamber; and means for further pressurizing one of the chambers while draining the other chamber to effect linear movement of the piston member into abutting engagement with said valve member or said first carrier member to move said valve member towards a closed or an open valve position respectively.

2. The manual override system of claim 1 wherein said valve body includes an extension member between a housing section containing said valve member and said barrier member, said piston member being located within said extension member and longitudinally surrounding a valve stem connecting said valve member to said first carrier member.

3. The manual override system of claim 2 wherein said means for pressurizing includes a pair of quick-connect self-sealing plugs within said extension, each plug communicating with a respective one of said chambers, a source of high pressure hydraulic fluid connectable to one of said plugs to pressurize the chamber associated therewith, and means connectable to the other of said plugs for draining the chamber associated therewith.

4. The manual override system of claim 3 including O-ring seal means for sealing said skirt with respect to said bore and for sealing each end of said piston member with respect to said extension member.

* * * * *